United States Patent
Widenhofer

[15] 3,701,175
[45] Oct. 31, 1972

[54] HYDROPHONE DAMPER ASSEMBLY

[72] Inventor: James W. Widenhofer, Jackson, Mich.

[73] Assignee: Sparton Corporation, Jackson, Mich.

[22] Filed: June 9, 1971

[21] Appl. No.: 151,269

[52] U.S. Cl. ................................9/8 R, 340/2, 340/3, 340/7, 340/8
[51] Int. Cl. ..........................B63b 21/52, B63b 51/02
[58] Field of Search ................340/2, 3, 7, 8, 8 S; 9/8

[56] References Cited

UNITED STATES PATENTS

| | | | |
|---|---|---|---|
| 3,543,228 | 11/1970 | Farmer | 340/2 |
| 3,377,615 | 4/1968 | Lutes | 340/2 |
| 3,329,015 | 7/1967 | Bakeke et al. | 340/2 |
| 2,790,186 | 4/1957 | Carapellotti | 9/8 R |

*Primary Examiner*—Benjamin A. Borchelt
*Assistant Examiner*—Harold J. Tudor
*Attorney*—Beaman & Beaman

[57] ABSTRACT

A damper for use in submerged hydrophone suspension systems including an elongated mass cylinder defined by a tube of flexible synthetic plastic film utilizing a check valve located at each end permitting water to enter the tube and preventing egress. Additionally, each tube end is provided with a disk transversely disposed to the tube length and of a diameter substantially greater than that of the tube to provide drag and hydrodynamic mass damping. The tube and disk are of a configuration to eliminate vortex shedding and the entire damper assembly is capable of being folded and packed within a concise configuration prior to deployment.

12 Claims, 10 Drawing Figures

PATENTED OCT 31 1972

INVENTOR
JAMES W. WIDENHOFER
BY Beaman & Beaman
ATTORNEYS

HYDROPHONE DAMPER ASSEMBLY

BACKGROUND OF THE INVENTION

The invention pertains to the field of motion damping devices used with submerged marine instrumentation for damping instrumentation movement and displacement due to wave and water motion.

In underwater transducer and hydrophone installations, such as in a sonobuoy system for detecting submarine sounds and the like, the provision of a substantially stable platform for the hydrophone is of prime importance in order to reduce extraneous noises and signals and permit the most accurate sound pressure wave input characteristics.

The purpose of sonobuoy suspension systems is to attenuate the vertical motion imparted by surface wave action to a hydrophone platform as motion of the hydrophone due to surface wave action will result in the generation of spurious low frequency signals. The attenuation system itself must not produce low frequency lateral motion oscillation such as those commonly found in objects suspended in ocean currents resulting from periodic shedding of vortices in the flowing fluid.

In a free floating sonobuoy system it is also important that a high drag concentration in the vicinity of the hydrophone platform be produced to reduce the relative velocity of the flow past the hydrophone to minimize the magnitude of any occurring flow noise as well as reducing the frequency of the noise associated with boundry layer transition on the hydrophone surfaces. Additionally, the magnitude and frequency of any unavoidable motion associated with vortex shedding is simultaneously reduced.

Improved transducer suspension systems have been achieved by the utilization of complaint members such as shown in the assignee's U.S. Pat. No. 3,377,615. Additionally, the utilization of specialized configurations in floating and buoy systems for stabilization purposes are known as shown in U.S. Pat. Nos. 3,191,202, 3,500,783, 3,510,892 and 3,543,228. However, a damper assembly for use with submerged hydrophone assemblies wherein a mass damper of an effective construction capable of being concisely stored has not been previously successfully achieved.

SUMMARY

It is an object of the invention to provide a low cost damper for the purpose of stabilizing the position of a hydrophone platform in order to reduce the introduction of spurious noises and signals into the hydrophone. The damper of the invention utilizes both mass, drag and hydrodynamic mass damping characteristics, and while the mass of the damper is significant when deployed, its weight when stored is very small and its unique construction utilizes entrapped water to produce the desired damping mass.

Additionally, the damper assembly of the invention isolates the hydrophone platform from any direct input of residual strumming produced by the compliant cable spring suspension utilized in conjunction with the hydrophone, and the construction of the damper is such as to minimize the occurrence of vibration due to water current and flow past the damper components.

The damper assembly in accord with the invention includes a long cylinder of flexible synthetic plastic film closed at each end by a check valve of unique configuration which permits water to enter, but not leave the tube. Disks having a diameter substantially greater than that of the tube are attached to each tube end at the check valves transversely disposed to the tube length to produce hydrodynamic damping and the disks are canted with respect to each other to minimize adverse effects produced by vortex shedding. An inelastic strip is affixed to the tube extending its length causing the tube to be warped or curved in an arc in the longitudinal direction minimizing rotation of the damper due to waterflow, and elimination of such rotation is important as rotation will aggravate the instability of the damper assembly in a shear current.

The disks located at the tube end are formed of synthetic plastic film and their shape is maintained, when deployed, by a flexible, resilient ring formed of a spring steel material which forms an expanded cylindrical configuration as soon as the damper is deployed and removed from its storage cannister.

Assembly of the damper is simplified by the utilization of retaining members defined on the check valve wherein a mechanical interconnection between the tube and associated disks is simultaneously achieved by the assembly of the check valve structure. Also, suspension means are defined on the check valve permitting the damper to constitute a component in the hydrophone suspension system.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
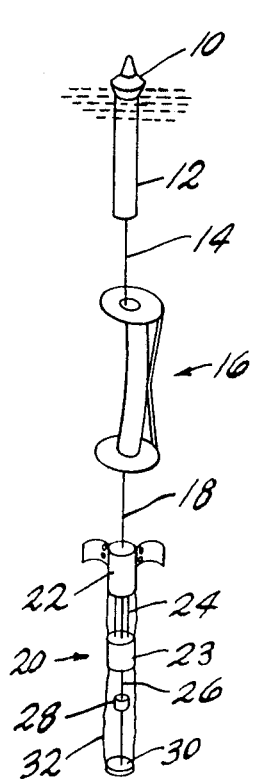
FIG. 1 is a perspective view of a deployed sonobuoy system utilizing the damper of the invention.

FIG. 1 illustrates a deployed sonobuoy system using a damper and improved transducer platform for providing high quality transmission of underwater sound vibrations. The sonobuoy float 10 floats upon the surface of the water and the cannister 12 depends from the float. The cannister is of a hollow cylindrical configuration and prior to deployment houses the sonobuoy components. In those cases where the sonobuoy is dropped from aircraft the cannister serves to protect the transducer, damper and other components upon impact with the water. A cable 14 depends from the cannister and is attached to the upper end of the damper assembly generally indicated at 16. A second cable 18 depends from the lower end of the damper assembly and is attached to the hydrophone assembly generally indicated at 20. The assembly 20 includes instrumentation housing 22, housing 23, compliant expansion cables 24 and 26, hydrophone 28, and weight 30. The housing 23 and hydrophone 28 are located within a mesh tube 32 which reduces flow noises and electrical conductors, not shown, interconnect the hydrophone with its transmitter housings 22 and 23 and the transmitter located within the cannister 12. The assembly 20 constitutes no part of the invention and is described in detail in the assignee's copending application, Ser. No. 111,410, filed Feb. 1, 1971. It is to be understood that the purpose of the damper assembly 16 is to provide a stable platform for the hydrophone assembly 20 and does so in the manner described below.

The damper assembly 16 includes a mass cylinder 34 formed by a tube or sleeve of flexible synthetic plastic film of only a few thousandths of an inch thickness whereby the cross-sectional configuration of the tube is cylindrical and the tube may be concisely folded.

The ends of the tube 34 are cut at substantially right angles to the tube length, when deployed, and are connected to check valve structure in a manner later described. The check valve structure 36 is identical at each end of the tube and each check valve includes retaining ring members whereby the tube and disk members associated at each tube end may be mechanically connected simultaneously to the check valve.

Figure 6:
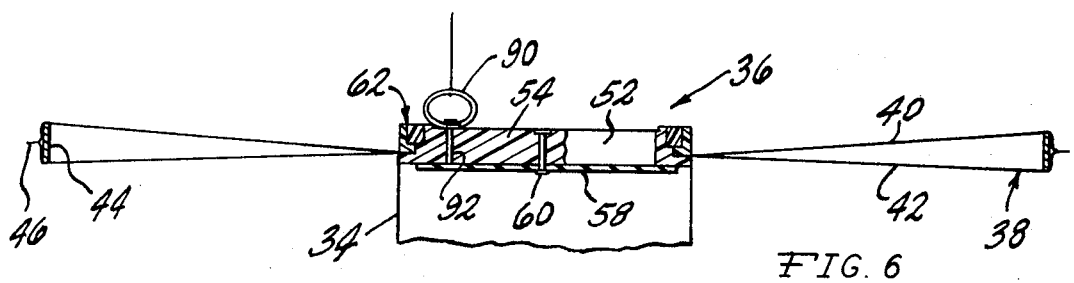
FIG. 6 is an enlarged cross-sectional view taken through the disk and check valve along Section VI—VI of FIG. 4.

The disks 38 are also each formed of synthetic plastic film having an upper layer 40 and a lower layer 42, FIG. 6. When deployed, the annular configuration of the disks is maintained by an annular resilient spring-like ring 44, and the disks are formed by a heat sealing process resulting in a peripheral seam 46.

Figure 2:
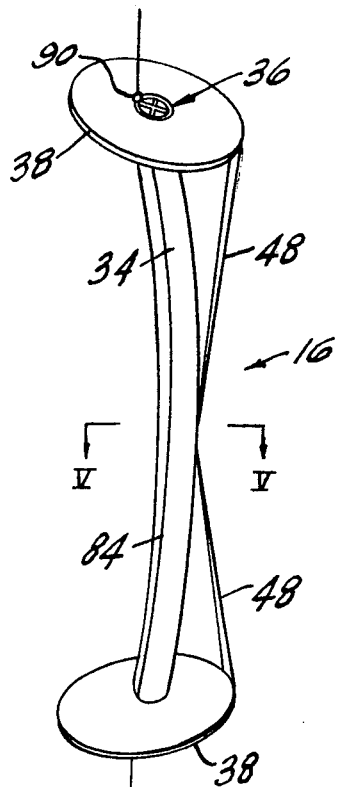
FIG. 2 is an elevational view of the damper in accord with the invention as deployed.
Figure 3:
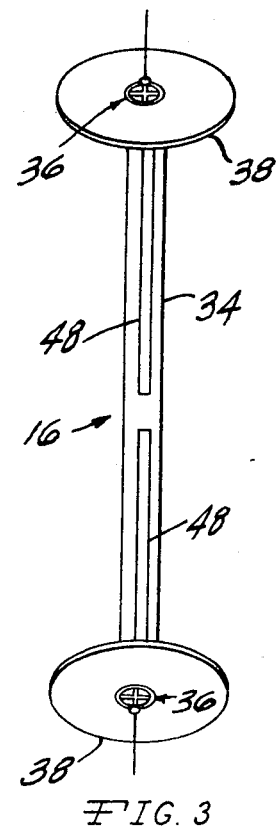
FIG. 3 is a view taken from the right of FIG. 2.

Stabilizer straps 48 of plastic film are connected to each of the peripheries of the disks 38 at one end, and connected to the central region of the tube 34 at the other end, and the length of the stabilizers is such that the disks 38 are canted with respect to each other as will be apparent in FIGS. 2 and 3.

Figure 4:
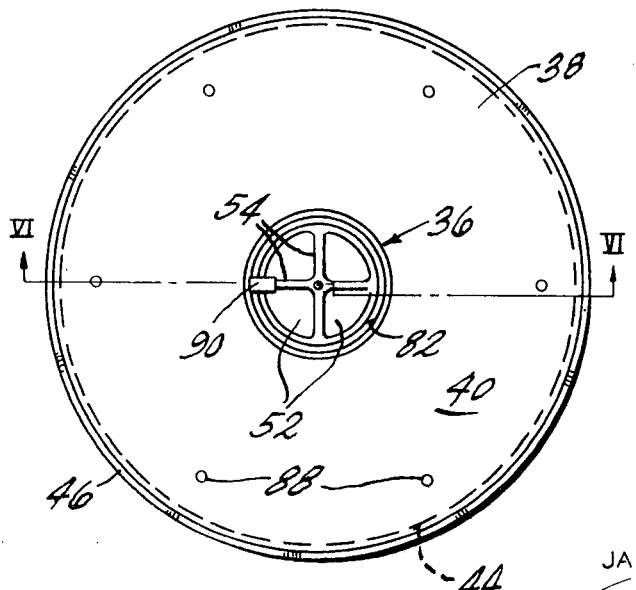
FIG. 4 is a top plan view as taken of FIG. 2.
Figure 7:
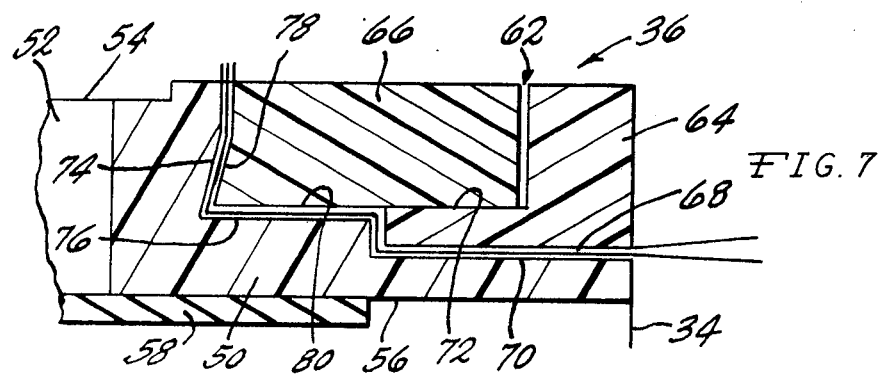
FIG. 7 is an enlarged cross-sectional view taken through the check valve rim region illustrating the retaining ring construction.

The check valve structure 36 will be appreciated from FIGS. 4, 6 and 7. As appreciated from FIG. 4, the check valves are of an annular configuration including a peripheral rim region 50. The body of the valve is formed of a synthetic plastic material and is of a cylindrical configuration including a passage 52. centrally defined therein through which water may flow into the tube 34. Webs 54 diametrically extend across the passage 52 and the inner surface 56 of the rim region serves as a valve seat for the resilient, flexible flap valve 58 riveted to the valve body at 60. Thus, it will be appreciated that water may flow through the passage 52 against the valve element 58 and around the valve element into the tube 34. However, the water may not flow from the tube in that the valve 58 seats against the surface 56, and that portion of the valve disposed over the passage 52 is supported by the webs 54.

The valves 36 are connected to the tube 34, and serve to interconnect the tube and disks by means of a retaining ring assembly 62 which consists of an outer annular ring 64 and annular inner ring 66. The ring 64 and an L cross-sectional configuration including a radial surface 68 for opposed relationship to the peripheral rim region surface 70. Also, the ring 64 is recessed at 72 whereby the ring 66 overlays the ring 64 to maintain the assembly thereof to the valve body.

The valve body peripheral rim region is provided with a conical "undercut" surface 74 and a radial surface 76 for cooperation with corresponding conical surface 78 and radial surface 80 defined upon the ring 66. The ring 66 is split at 82, FIG. 4, wherein once the ring 64 is positioned as shown in FIG. 7, the ring 66 may be inserted into the recess 72 defined by the ring 64 and the conical surface 74. Due to the presence of the conical surfaces 74 and 78 the ring 66 will be maintained in position, and thereby maintain the assembly of the retaining ring assembly 62 upon the valve body.

The tube material adjacent the tube end is disposed between the surfaces 68 and 70, the surfaces 76 and 80 and the surfaces 74 and 78 as appreciated from FIG. 7. Likewise, the synthetic plastic film layers constituting the layers 40 and 42 of the disks 38 are disposed between the aforementioned surfaces as illustrated whereby compression upon the material of the tube and disks is maintained between the valve body and the retaining ring assembly to form an effective sealing mechanical connection between the tube, associated disk and check valve structure.

The aforementioned check valve structure constitutes the subject matter of the assignee's pending U.S. Pat. application, Ser. No. 145,133, filed May 20, 1971.

Figure 5:
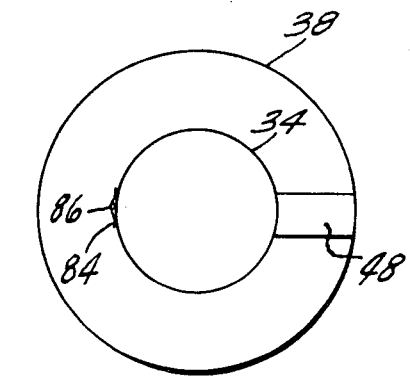
FIG. 5 is a cross-sectional view taken through the tube along Section V—V of FIG. 2.

An inelastic plastic strip 84 is adhered to the tube 34 throughout its length and electrical conductors 86, FIG. 5, are sandwiched between the tube 34 and the adhesive strip 84 wherein such conductors interconnect the hydrophone assembly 20 below the damper with the cannister 12 located vertically above. The disks 38 may be provided with vent holes 88, and loop anchors 90 formed of a reinforced fabric, FIG. 6, are defined on each of the valve structures 36, and affixed thereto by rivets 92, FIG. 6, to serve as the mounting for the suspension cables 14 and 18.

Figure 8:
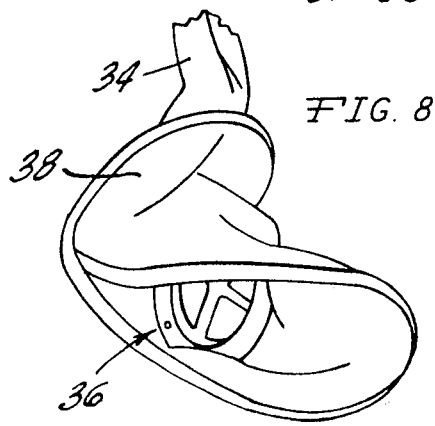
FIGS. 8 through 10 illustrate the folding of the disk and tube for packing into the sonobuoy cannister.
Figure 10:
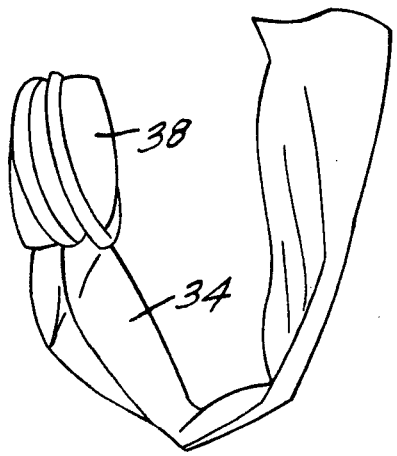
Figure 9:
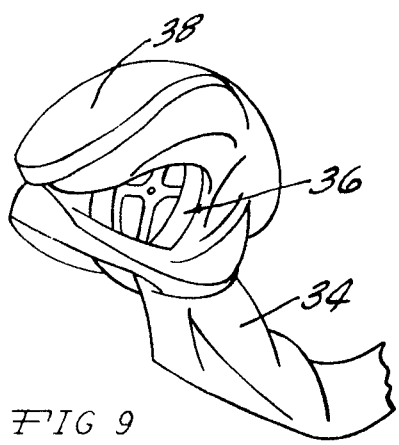

In that the tube 34 and disks 38 are formed of a highly flexible lightweight synthetic plastic film material it is possible to fold the entire damper assembly 16 in a space only slightly greater than that occupied by the valves 36 when stacked one upon the other. Such concise packaging is illustrated by the folding procedure shown in FIGS. 8 through 10. Each of the disks may be folded as illustrated due to the resilient nature of the annular rings 44 wherein each ring is folded and "-wound" to a diameter substantially equal to that of a check valve body. FIG. 10 illustrates the configuration of the disk once the ring is folded in the described manner. Thereupon the tube material may be sandwiched between the folded disks and check valves and the damper assembly is inserted into the cannister 12 intermediate the float 10 and the hydrophone assembly 20.

When the cannister 12 engages the water surface, the release mechanism permits the assemblies 20 and 16 to deploy from the cannister. The weight of the assembly 20 will pull the damper assembly 16 from the cannister and as the assembly 16 is removed from the confines of the cannister the rings 44 will, due to their resilient nature, "open" to form the disk configuration apparent in FIGS. 2 and 3. Additionally, as the damper assembly is pulled down through the water the water will be forced into the interior of the tube through the lower check valve passage 52. Any air trapped in the tube 34 will soon escape the tube upon wave motion causing an upward movement of the damper assembly wherein the upper check valve 36 will momentarily open and permit entrapped air to be released. The mass of the water entrapped within the tube 34 is significant and thus a mass damping is achieved.

The inelastic strip 84 causes the tube to form an arc rather than a straight line, and the strip 84 is located at 180° with respect to the stabilizer straps 48.

The configuration of the damper due to the presence of the inelastic strip 84 and the canting of the disks 38 stabilizes the damper in the presence of a shear current in that the curved configuration employed in conjunction with the offsetting of the points of attachment occurring at the attachment rings 90 located adjacent the check valve edge regions minimizes rotation of the damper, and as such rotation would aggravate the instability of the damper in a shear current such features are of significance.

Additionally, vortex shedding is greatly reduced due to the presence of the stabilizer straps 48 and the canting of the disks. This combination disrupts the normal waterflow around the tube breaking up the pattern of vortex shedding. Thus, the damper may be used in close proximity to a hydrophone platform without adverse effect.

Accordingly, it will be appreciated that the damper of the assembly effectively produces mass, drag and hydrodynamic mass damping with the utilization of economically produced structure easily stowable in a restricted volume container. Advantageous waterflow characteristics are achieved wherein the damper does not introduce extraneous vibrations into the hydrophone suspension system, and assembly of the damper components is minimized due to the mechanical interconnection thereof achieved by the check valves 36.

It is appreciated that various modifications to the inventive concept may be apparent to those skilled in the art without departing from the scope and spirit of the invention.

I claim:

1. A hydrophone damper assembly comprising, in combination, an elongated tube of flexible material having first and second ends, a check valve attached to each tube end and sealing the associated end, said check valves permitting water to enter the tube and preventing water egress, and attachment means associated with said tube for attaching hydrophone structure thereto.

2. In a hydrophone damper assembly as in claim 1 wherein said attachment means is mounted upon at least one of said check valves.

3. In a hydrophone damper assembly as in claim 1 wherein said tube is formed of a synthetic plastic film.

4. In a hydrophone damper assembly as in claim 1, a disk attached to said tube, said disk having a generally flat planar configuration and transversely related to the length of said tube and having a diameter greater than the diameter of said tube.

5. In a hydrophone damper assembly as in claim 4 wherein said disk is affixed to said tube adjacent one of said ends.

6. In a hydrophone damper assembly as in claim 5 wherein a disk is attached to each end of said tube.

7. In a hydrophone damper assembly as in claim 5 wherein said check valves include tube and disk mounting means, said valve at said one tube end attaching said disk to said tube.

8. A hydrophone damper assembly comprising, in combination, an elongated tube of flexible material having first and second ends, a check valve affixed to each tube end and closing the associated end permitting water to enter the tube and preventing water egress therefrom, a substantially flat disk member affixed to said tube adjacent each end whereby the general plane of said disks is transversely disposed to the tube length, and attachment means mounted upon said tube adjacent said ends for attaching hydrophone structure thereto.

9. In a hydrophone assembly as in claim 8 wherein said tube and disks are formed of a synthetic plastic film, each of said disks including a deformable resilient ring forming and maintaining the disk periphery.

10. In a hydrophone damper assembly as in claim 9 wherein said check valves include film retaining means, said film retaining means interconnecting and maintaining the assembly of the associated tube end, disk and check valve.

11. In a hydrophone damper assembly as in claim 8, disk orientation means interposed between said disks and said tube obliquely angularly orienting the plane of said disks to the length of said tube.

12. In a hydrophone damper assembly as in claim 11 wherein said tube is of a curved configuration relative to its length.

* * * * *